US012753824B2

(12) United States Patent
Storrer et al.

(10) Patent No.: US 12,753,824 B2
(45) Date of Patent: Oct. 6, 2026

(54) INTERCHANGABLE TENSIONER AND WIRE ATTACHMENT SYSTEM

(71) Applicant: Suncor Stainless Inc., Plymouth, MA (US)

(72) Inventors: James Storrer, Middleboro, MA (US); Patrick Striebel, Duxbury, MA (US)

(73) Assignee: Suncor Stainless Inc., Plymouth, MA (US)

(*) Notice: Subject to any disclaimer, the term of this patent is extended or adjusted under 35 U.S.C. 154(b) by 247 days.

(21) Appl. No.: 18/653,611

(22) Filed: May 2, 2024

(65) Prior Publication Data

US 2024/0368914 A1 Nov. 7, 2024

Related U.S. Application Data

(60) Provisional application No. 63/464,422, filed on May 5, 2023.

(51) Int. Cl.
*F16G 11/12* (2006.01)

(52) U.S. Cl.
CPC .................................... *F16G 11/12* (2013.01)

(58) Field of Classification Search
CPC ............... E04F 11/1834; E04F 11/1817; E04F 11/1859; E04F 2011/1821; E04F 2011/1819; E04F 2011/1882; F16G 11/04; F16G 11/12
See application file for complete search history.

(56) References Cited

U.S. PATENT DOCUMENTS

| | | | | |
|---|---|---|---|---|
| 2,463,144 | A | 3/1949 | Buchanan | |
| 3,278,210 | A | 10/1966 | Sanders | |
| 3,652,049 | A | 3/1972 | McCown et al. | |
| 3,895,879 | A | 7/1975 | Burtelson | |
| 3,960,359 | A | 6/1976 | Svahn et al. | |
| 4,066,368 | A | 1/1978 | Mastalski et al. | |
| 4,594,018 | A | 6/1986 | Larsson et al. | |
| 4,627,762 | A | 12/1986 | Scotti | |
| 4,671,695 | A | 6/1987 | Scotti | |
| 5,022,780 | A * | 6/1991 | Shaw .................... | F16G 11/048 24/122.3 |
| 7,198,253 | B2 | 4/2007 | Striebel et al. | |
| 9,790,707 | B2 | 10/2017 | Burt et al. | |
| 10,436,231 | B2 * | 10/2019 | White ................... | F16G 11/025 |
| 10,883,290 | B2 | 1/2021 | Burt et al. | |

(Continued)

FOREIGN PATENT DOCUMENTS

| | | | |
|---|---|---|---|
| DE | 29517079 | U1 | 4/1996 |
| DE | 29915271 | U1 | 12/1999 |
| GB | 2388636 | A | 11/2003 |

OTHER PUBLICATIONS

Product Information for Part 8017, Ram Tail [online] <URL:https://ramtail.com/products/> (2024), 1 page.

*Primary Examiner* — Daniel J Wiley
(74) *Attorney, Agent, or Firm* — ArentFox Schiff LLP; Marlo Schepper Grolnic

(57) ABSTRACT

A tensioning wire attachment system includes a tensioning device, which includes a first collar connectable to a threaded stud. The threaded stud is connectable to a mounting plate via a tubular body. The assembly also includes a first gripping wedge secured within the first collar via an inside thread of the first collar. The first gripping wedge secures a first wire.

10 Claims, 6 Drawing Sheets

(56) References Cited

U.S. PATENT DOCUMENTS

| | | | | |
|---|---|---|---|---|
| 11,300,180 | B2 | 4/2022 | Graber et al. | |
| 11,391,344 | B1 * | 7/2022 | Sargent | F16G 11/106 |
| 11,629,502 | B1 * | 4/2023 | Smitchko | E04F 11/1859<br>256/47 |
| 2003/0010966 | A1 | 1/2003 | Sjostedt | |
| 2003/0178611 | A1 | 9/2003 | Anderson | |
| 2005/0071958 | A1 * | 4/2005 | Toimil | F16G 11/106<br>24/136 R |
| 2005/0207838 | A1 * | 9/2005 | Striebel | E04F 11/1834<br>403/368 |
| 2007/0155234 | A1 * | 7/2007 | Szoke | E04F 11/1812<br>439/583 |
| 2011/0084180 | A1 * | 4/2011 | Toimil | F16G 11/106<br>248/74.2 |
| 2018/0003202 | A1 * | 1/2018 | White | F16G 11/025 |
| 2020/0399907 | A1 * | 12/2020 | Leary | F16B 5/0283 |
| 2022/0298799 | A1 * | 9/2022 | Lord | E04F 11/1834 |
| 2022/0325778 | A1 * | 10/2022 | Ross | F16B 9/054 |
| 2024/0410445 | A1 * | 12/2024 | Lam | F16G 11/12 |

* cited by examiner

INTERCHANGABLE TENSIONER AND WIRE ATTACHMENT SYSTEM

CROSS REFERENCE TO RELATED APPLICATIONS

The present application claims the benefit of provisional application No. 63/464,422, filed May 5, 2023.

FIELD OF TECHNOLOGY

The present disclosure is in the field of wire attachment and tensioning, in particular cable and cable railing.

BACKGROUND

Deck cable railing is used as an alternate form of infill to balustrade or glass. Cables are arranged horizontally or vertically to create an infill for safety. The wire/cable is typically steel or stainless steel. It is attached by various methods such as crimped to a connection, swaged to fittings, or a mechanical connection. The attachment is mounted to posts, walls, or hand railings as needed. The attachment may be in the form of a lag screw, or a flat mounting plate, or a curved plate to fit the contour of a round post. Tension is applied to one end of the cable to keep it taught. Various sizes of cable can be used each requiring unique attachments per diameter and construction. Manufacturing of multiple types of attachments and cable connections are costly. There is a need to make the cable connections interchangeable for various sizes of cable.

SUMMARY

According to one aspect, a tensioning wire attachment system is provided. The system includes a tensioning device, which includes a first collar connectable to a threaded stud. The threaded stud is connectable to a mounting plate via a tubular body. The system also includes a first gripping wedge secured within the first collar via an inside thread of the first collar. The first gripping wedge secures a first wire.

In some implementations of the tensioning wire attachment system, the first collar includes an outer diameter of a first value, a first hex shoulder of a first value, an overall length of a first value, the inside thread of a first value, a frustoconical inside shape of a first value, and an aperture inside diameter of a first value. In some implementations, the first gripping wedge includes a first gripping wedge bore. The first gripping wedge bore includes a first inside diameter of a first value and a first outer diameter. The first outer diameter includes a first outer diameter that is smaller than the inside thread of the first collar and/or a second and/or third collars. The first gripping wedge is fixedly attached to any of the first collar and/or a second and/or third collars.

In some implementations of the tensioning wire attachment system, a second tensioning device is included. In the second tensioning device, the second collar is connectable to a second threaded stud. The second threaded stud is connectable to a second mounting plate via a second tubular body. The second tensioning device also includes a second gripping wedge secured within the second collar via an inside thread of the second collar. The second gripping wedge encloses a second wire. The second collar includes an outer diameter of a second value, a second hex shoulder of a second value, an overall length of a second value, the inside thread of the first value, a frustoconical inside shape of a first value, and aperture inside diameter of the first value. The second gripping wedge is fixedly attached to any of the first through second collars. The second gripping wedge includes a second gripping wedge bore, with a second inside diameter of a second value, a first outer diameter that is smaller than the inside thread of the first collar and/or a second and/or third collars, with a first frustoconical outside shape that is equivalent to the first collar and/or a second and/or third collars inside frustoconical inside shape, configured to allow fixed attachment between any of the first collar and/or a second and/or third collars.

In some implementations of the tensioning wire attachment system, a third tensioning device is included. In the third tensioning device, the third collar connectable to a third threaded stud. The third threaded stud is connectable to a third mounting plate via a third tubular body. The third tensioning device includes a third gripping wedge secured within the third collar via an inside thread of the third collar. The third gripping wedge encloses a third wire. The third collar includes an outer diameter of a third value, a third hex shoulder of a third value, an overall length of a third value, the inside thread of the first value, a frustoconical inside shape of the first value, and aperture inside diameter of the first value. The third gripping wedge is fixedly attached to any of the first through third collars. The third gripping wedge includes a third gripping wedge bore, with a third inside diameter of a third value, a first outer diameter that is smaller than the inside thread of the first collar and/or a second and/or third collars, with a first frustoconical outside shape that is equivalent to the first collar and/or a second and/or third collars inside frustoconical inside shape, configured to allow fixed attachment between any of the first collar and/or a second and/or third collars.

In some implementations of the tensioning wire attachment system, an nth collar is included. The nth collar has an outer diameter of an nth value, an nth hex shoulder of an nth value, an overall length of an nth value, an inside thread of a first value, a frustoconical inside shape of a first value, and aperture inside diameter of a first value. The first, second and third gripping wedges are also configured to be fixedly attached to the nth collar. In some implementations, n is an integer greater than 3 and/or a positive integer.

In some implementations of the tensioning wire attachment system, an nth gripping wedge configured to be fixedly attached to any of the first through third collars is included. The nth gripping wedge includes an nth gripping wedge bore including an nth inside diameter of an nth value and an nth outer diameter that is smaller than the inside thread of the collar of a first through third value, including an nth frustoconical outside shape that is equivalent to the first through third collar inside frustoconical inside shape. The nth gripping wedge is configured to allow fixed attachment between the first through third collars. In some implementations, n is an integer greater than 3.

In some implementations of the tensioning wire attachment system, the first wire is fixedly attached to the first gripping wedge. The first wire includes a first wire outside diameter of a first value. The first value is equivalent to the first gripping wedge inner diameter to allow a fixed attachment between the first wire and the first gripping wedge.

In some implementations of the tensioning wire attachment system, a second wire is fixedly attached to the second gripping wedge. The second wire includes a second wire outside diameter of a second value. The second value is equivalent to the second gripping wedge inner diameter to allow a fixed attachment between the second wire and the second gripping wedge. In some implementations, a third wire is fixedly attached to the third gripping wedge. The third wire includes a third wire outside diameter of a third value. The third value is equivalent to the third gripping wedge inner diameter to allow a fixed attachment between the third wire and the third gripping wedge.

In some implementations of the tensioning wire attachment system, an nth wire is fixedly attached to an nth gripping wedge. The nth wire includes an nth wire outside diameter of an nth value. The nth value is equivalent to the nth gripping wedge inner diameter to allow a fixed attachment between the nth wire and the nth gripping wedge. In some implementations, n is a positive integer and/or greater than 3.

In some implementations of the tensioning wire attachment system, the threaded stud connects any of the first, second, and/or third collars, first, second, and/or third gripping wedges, and first, second, and/or third wires via a washer and a wedge. The threaded stud includes a flat and/or hexed shoulder, an external thread, and a threaded end. The external thread allows attachment to any of the first, second, and/or third collars, and the threaded end allows attachment to a tubular body and a locking nut.

In some implementations of the tensioning wire attachment system, the tubular body includes an internal thread matching the external thread of the threaded stud, a hemispherical end, and a flat and/or hexed shoulder configured to allow gripping with a wrench. In some implementations of the tensioning wire attachment system, the mounting plate includes a center aperture. The center aperture allows the tubular body to pass through. The mounting plate also includes a recess adjacent to the center aperture. The recess is hemispherical, matches a contour of the tubular body, and is configured for rotational movement of the tubular body. The mounting plate also includes a groove. The groove is perpendicular to a surface of the mounting plate and allows for the tubular body to pivot within positioning the mounting plate angularly.

In some implementations of the tensioning wire attachment system, one or more additional apertures in a circular arrangement around the center aperture are included. The one or more additional apertures are configured to allow one or more fasteners to pass through. In some implementations, the one or more fasteners are configured to secure the mounting plate to a mounting surface. In some implementations, additional collars and/or additional gripping wedges are configured to allow one or more wire rope sizes to be attached in the system between one or more of the mounting surfaces.

According to another aspect, a tensioning wire attachment system is provided. The tensioner and wire attachment system includes a tensioning device, which includes a collar connectable to a threaded stud. The threaded stud is connectable to a mounting plate via a tubular body. The assembly also includes a gripping wedge secured within the collar via an inside thread of the first collar. The gripping wedge secures a wire. The threaded stud connects the collar, gripping wedge, and wire via a washer and a wedge. The threaded stud includes a flat and/or hexed shoulder, an external thread, and a threaded end. The external thread allows attachment to the collar, and the threaded end allows attachment to a tubular body and a locking nut.

In some implementations of the tensioning wire attachment system, the tubular body includes an internal thread matching the external thread of the threaded stud, a hemispherical end, and a flat and/or hexed shoulder configured to allow gripping with a wrench. In some implementations, the mounting plate includes a center aperture. The center aperture allows the tubular body to pass through. The mounting plate also includes a recess adjacent to the center aperture. The recess is hemispherical, matches a contour of the tubular body, and is configured for rotational movement of the tubular body. The mounting plate also includes a groove. The groove is perpendicular to a surface of the mounting plate and allows for the tubular body to pivot within positioning the mounting plate angularly.

In some implementations of the tensioning wire attachment system, one or more additional apertures in a circular arrangement around the center aperture are included. The one or more additional apertures are configured to allow one or more fasteners to pass through. In some implementations, the one or more fasteners are configured to secure the mounting plate to a mounting surface.

DETAILED DESCRIPTION

Aspects of the present disclosure include a wire attachment and tensioning system. For example, this system can include a railing system. The system can include a device, which may be made of hard plastics or other materials, such as steel or aluminum. In some embodiments, the material can be a corrosion resistant steel. This device can be attached to a mounting surface by various means, such as, via a mounting plate. For example, the mounting plate may be a flat plane, or include a semi-round contour in order to accommodate one or more mounting surfaces. In some embodiments, the device attaches to various sizes of cable/wire rope opposite a mounting plate, which can impose tension upon the attached cable.

In some embodiments, the mounting surfaces may be rigid, and may include a wooden post, a steel post, a post consisting of other materials. These posts may include square, round, and/or other shapes. The mounting surfaces of the present disclosure also may include a cement, wooden, metal, and/or like material structure. For example, if the device were to be used in a vertical plane, a wooden, steel, or other material, such as plastic, may be utilized as the mounting surface to accommodate the environment, individual preference, or other considerations.

As previously introduced, the attachment and tensioning system of the present disclosure can be adapted to fit multiple sizes of wire rope with a tensioning device. More specifically, this tensioner assembly can allow for mounting multiple sizes of wire rope. For example, the cable railing system may use 3/32", 1/8", 5/32", or 3/16" wire rope sizes, all within the same device. In some embodiments, tensioning can be achieved by restraining a threaded stud subassembly end, while rotating a tensioner tubular body. This can cause the threads of a stud to be pulled inward. The tubular body may rotate about its axis within the mounting plate due to the hemispherical shapes, in some embodiments. After tension is achieved, the threaded stud may be locked in position, with the nut against the tubular body.

In some embodiments, the assembly may also have interchangeable collars and wedges. The collars may have various thicknesses and hex sizes, with a common internal size, allowing various gripping wedges of various internal diameters, with a common external size, to fit within the collar. The various gripping wedges may allow for multiple wire ropes to be used within the same device. These features can thereby reduce manufacturing costs due to shared components.

Figure 1:
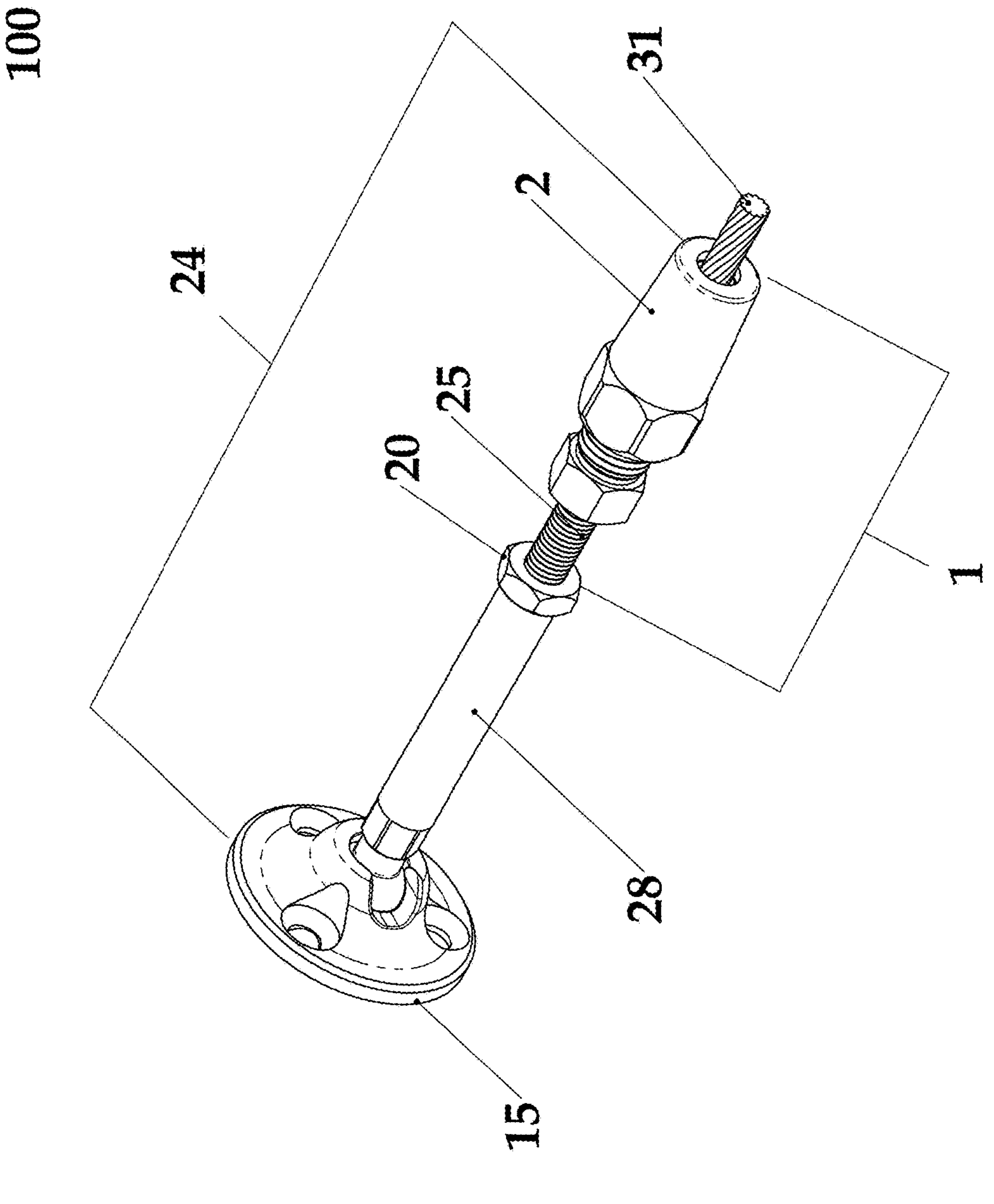
FIG. 1 is a schematic of the exemplary attachment and tensioning assembly.

FIG. 1 is an example schematic 100 of an attachment and tensioning assembly. Schematic 100 includes device 24, which can include attachment system 1. Attachment system 1 can provide a means to secure the wire/cable 31 utilizing a mechanical crimp of a collar 2 and a gripping wedge 9 (shown in FIG. 2). In some embodiments, when the tubular body swivel 22 (shown in FIG. 2) is inserted with into the mounting plate 15, the threaded stud 25 subassembly end can be formed distinctly from attachment system 1. The attachment system 1 (which in FIG. 1, includes threaded stud 25, collar 2, gripping wedge 9, washer 30, and nut 20) can be threaded into the tubular body 28, which in combination with the threaded stud 25 subassembly end, can form tensioning assembly/device 24. In some embodiments, a threaded rigid member, such as threaded stud 25, and a washer 30 (shown in FIG. 2) can apply pressure on gripping wedge 9.

Figure 2:
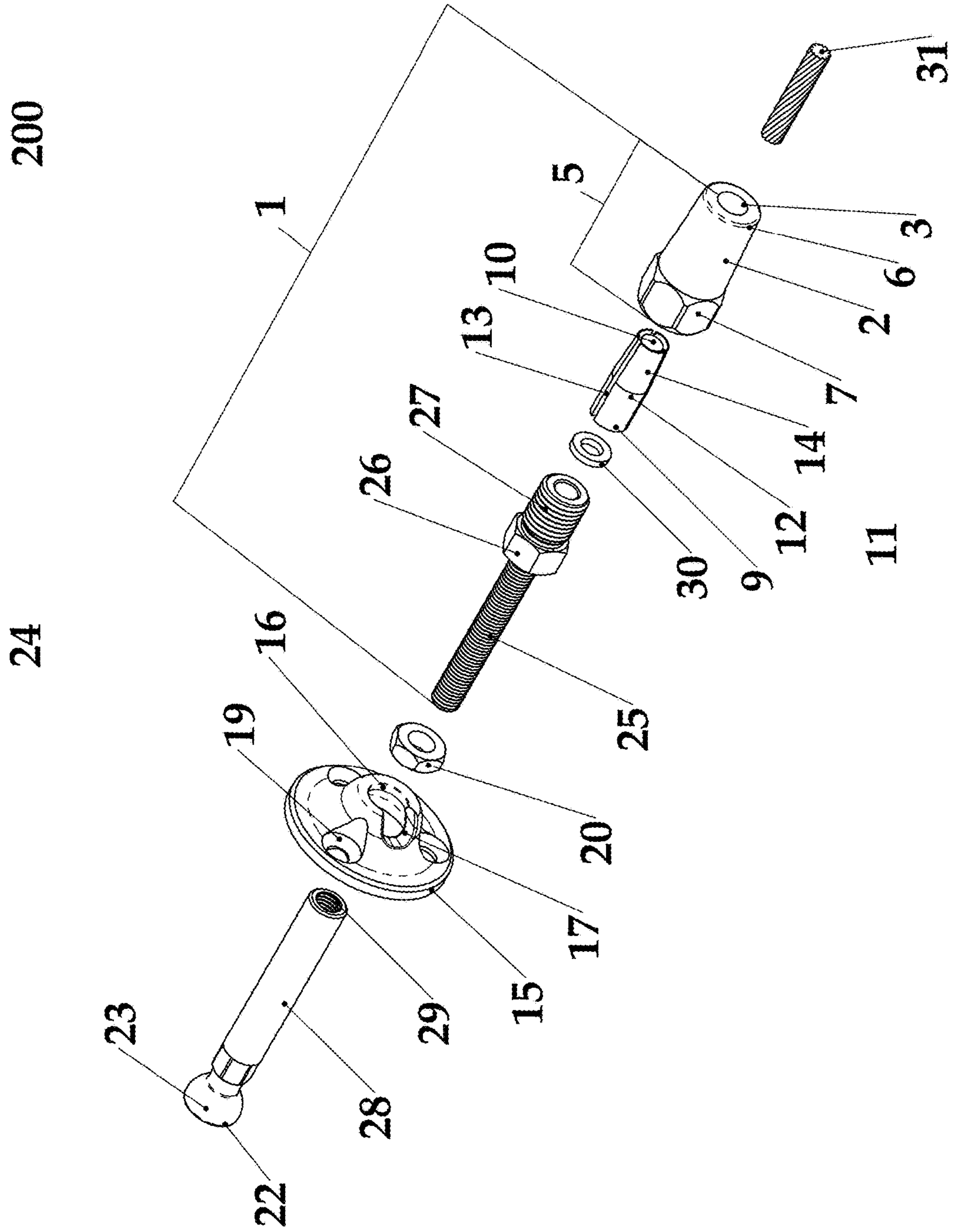
FIG. 2 is an exploded schematic of the exemplary attachment assembly and tensioning assembly.
Figure 3:
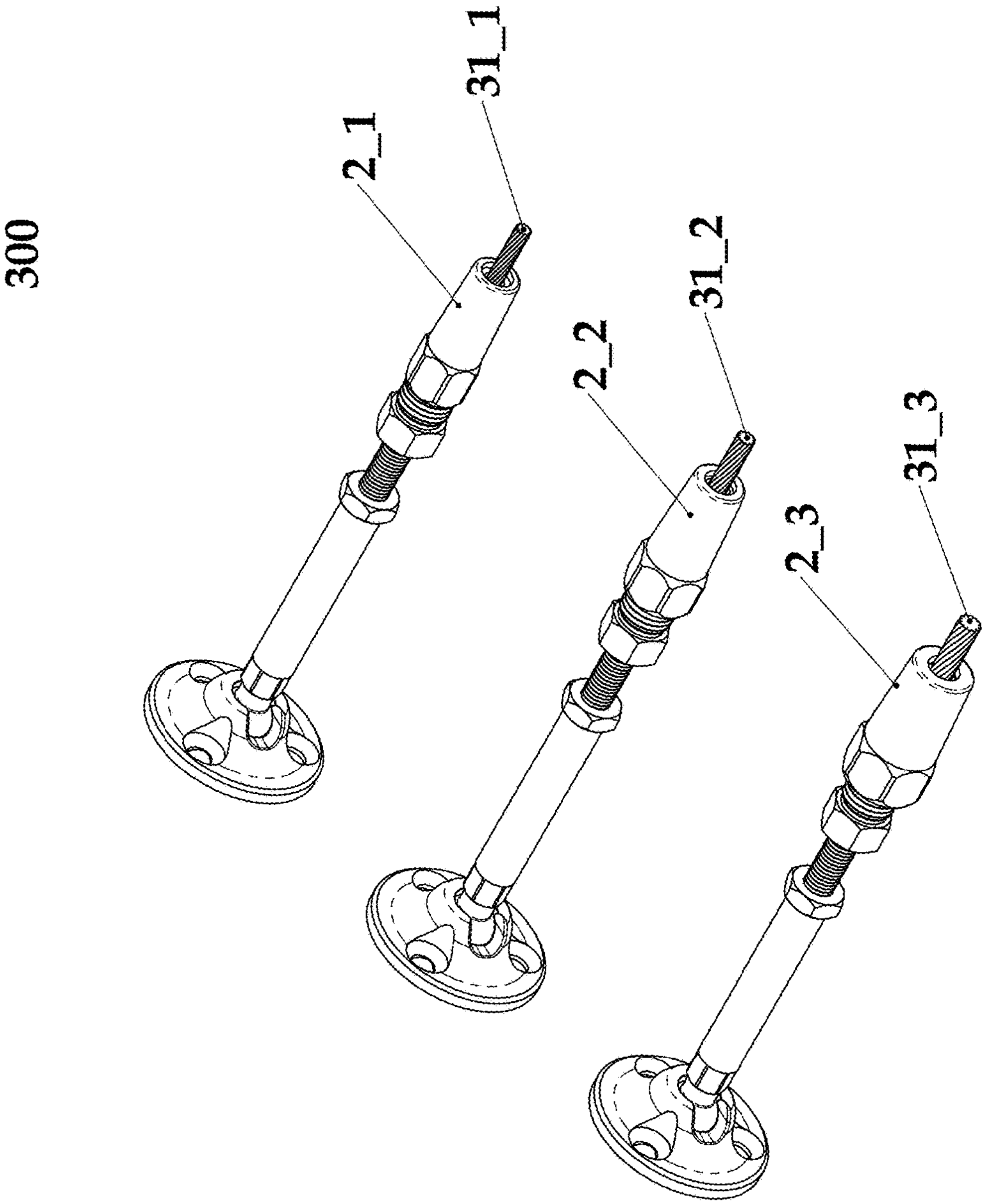
FIG. 3 is a schematic of a series of the exemplary attachment and tensioning assemblies illustrating the three types of possible attachment assemblies within a tensioning assembly.

FIG. 2 is an exploded schematic 200 of the attachment assembly and tensioning assembly of FIG. 1. As shown in FIG. 2, and previously introduced in FIG. 1, attachment assembly/system 1 can include threaded stud 25 attached to any of the collars 2, including collars 2_1, 2_2, and 2_3, as shown in FIG. 3. In some embodiments, the external thread 27 of one end of the threaded stud 25 can match the internal thread 8 (shown in FIG. 6) of the collar 2 to promote connectivity. The threaded stud 25 may have shoulder portions, flats, or hex shoulder 7, as in FIG. 2, which can allow gripping with a tool for adjusting tightness. As introduced previously the threaded stud 25 may have a hole 3 on the collar attachment end to allow a wire rope 31 to pass into based on various diameters, such as 3_1 in FIG. 6. Opposite to the collar internal thread 8 end, in some embodiments, the threaded stud 25 may have thread with sufficient length to match the internal thread 29 of the tubular body 28 to further promote connectivity throughout tensioning device 24.

Also shown in FIG. 2, washer 30 may be disposed between threaded stud 25 and gripping wedge 9, and within collar 2. The gripping wedge 9 may contain grooves 13, 14 passing through into the center aperture 10. Gripping wedge 9 may also include multiple other grooves 14, cut to a depth, but not through, to the center aperture 10. Grooves 13 and/or 14 may be included to allow the gripping wedge 9 to compress wire 31. Collar 2 may include internal threading 8 to match external threads 27 of the rigid member threaded stud 25.

Figure 6:
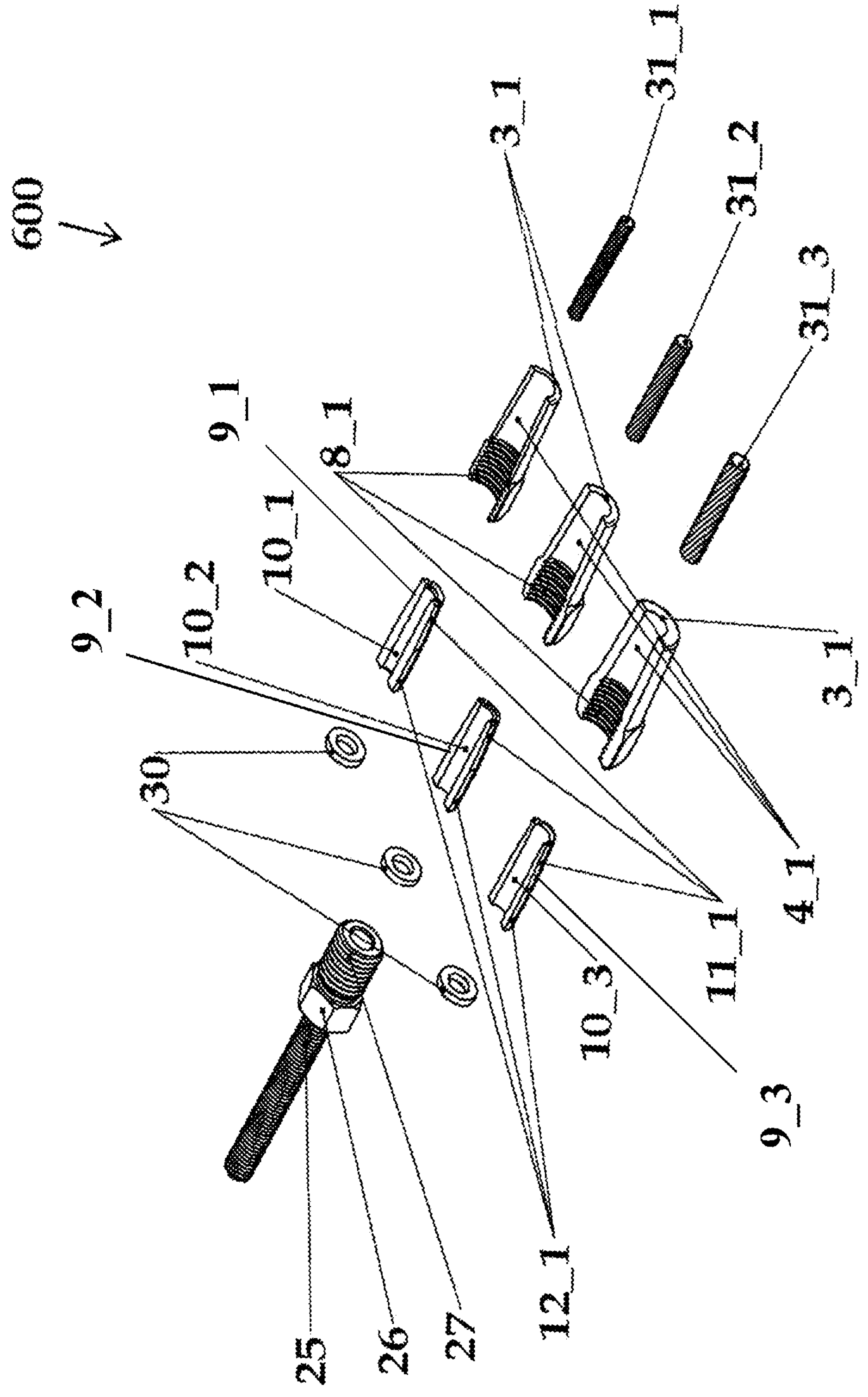
FIG. 6 is an exploded and section schematic of the exemplary attachment assembly with three possible wire attachments.

Schematic 200 of the attachment assembly and tensioning assembly of FIG. 1 may include varying diameters, lengths, and other dimensions in order to accommodate different environments and/or represent different embodiments, as shown in FIGS. 2, 3, and 6. In some embodiments, the outer diameter of washer 30 may be smaller than the inside thread 8_1 of the collars 2_1, 2_2, and/or 2_3. The internal diameter of the washer 30 may be slightly larger than the largest of the three wires 31 (i.e. wire 31_3, as shown in FIG. 3) in order to accommodate a number of different wire 31 sizes. The outer diameter 12 of gripping wedge 9, as shown in FIG. 6 as 12_1, may also be customized in order to fit within collar 2 and/or system 1. Likewise, the length 5 and/or outer diameter 6 of collar 2 may also be customized.

In FIG. 2, the washer 30 may also have a sufficient thickness to resist compression within attachment system 1 and/or device 24. In embodiments, wire 31 may pass through washer 30, gripping wedge 9, and into the internal hole of threaded stud 25 as it is inserted through collar 2. To adjust attachment system 1, a wrench may grip hex shoulder 7 of the collar 2, and/or shoulder hex 26 of threaded stud 25, tightening the threads and causing washer 30 to push against gripping wedge 9. In this way, frustoconical shape 11 of gripping wedge 9 may be forced against the inside frustoconical shape 4 of the collar 2. The gripping wedge 9 can thereby be forced to compress around the wire 31 within attachment system 1 and/or device 24.

Also within device 24 of FIG. 2, in some embodiments, the internal threading of nut 20 may correspond with the external threading of threaded stud 25 in order to be placed on threaded stud 25. The nut 20 may include a shoulder with flats, or a hex, to allow a wrench to tighten the device 24. As shown in FIGS. 1 and 2, device 24 may include tubular body 28. The tubular body 28 may be cylindrical in shape, with an internal thread 29 matching the external threading of the threaded stud 25 to promote connectivity. In some embodiments, the length of the internal thread 29 may be slightly longer than the external threading of the threaded stud 25 to satisfactorily envelop threaded stud 25. In one embodiment, one end of the tensioner tubular body 28 may have a swivel 22, with a hemispherical shape 23 to allow rotation within a mounting plate 15. Hemispherical shape 23 may also allow angular movement within mounting plate 15 via groove 17. A shoulder with flat, or hex shape, may be near the end of the body hemispherical shape 23 proximal to system 1 to allow gripping with a tool, such as a wrench.

Figure 4:
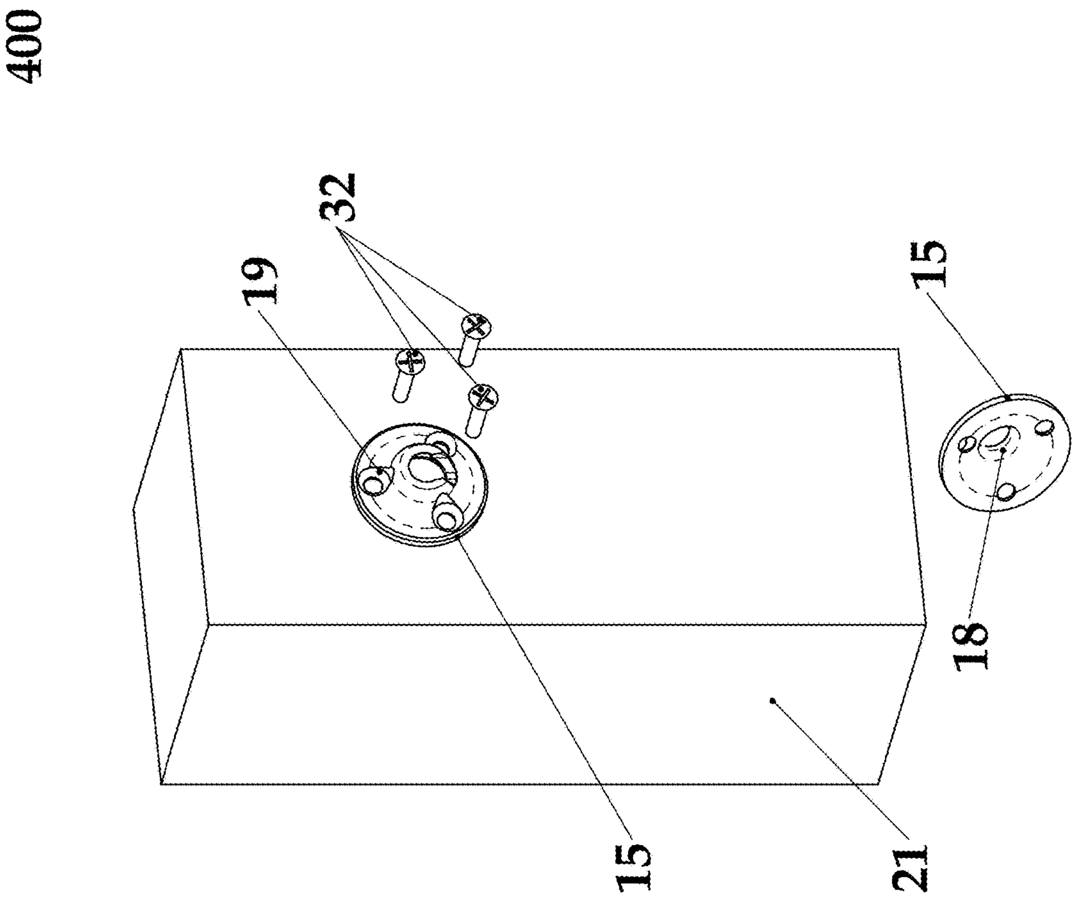
FIG. 4 is a schematic illustrating the exemplary mounting plate features and mounting to a railing post.
Figure 5:
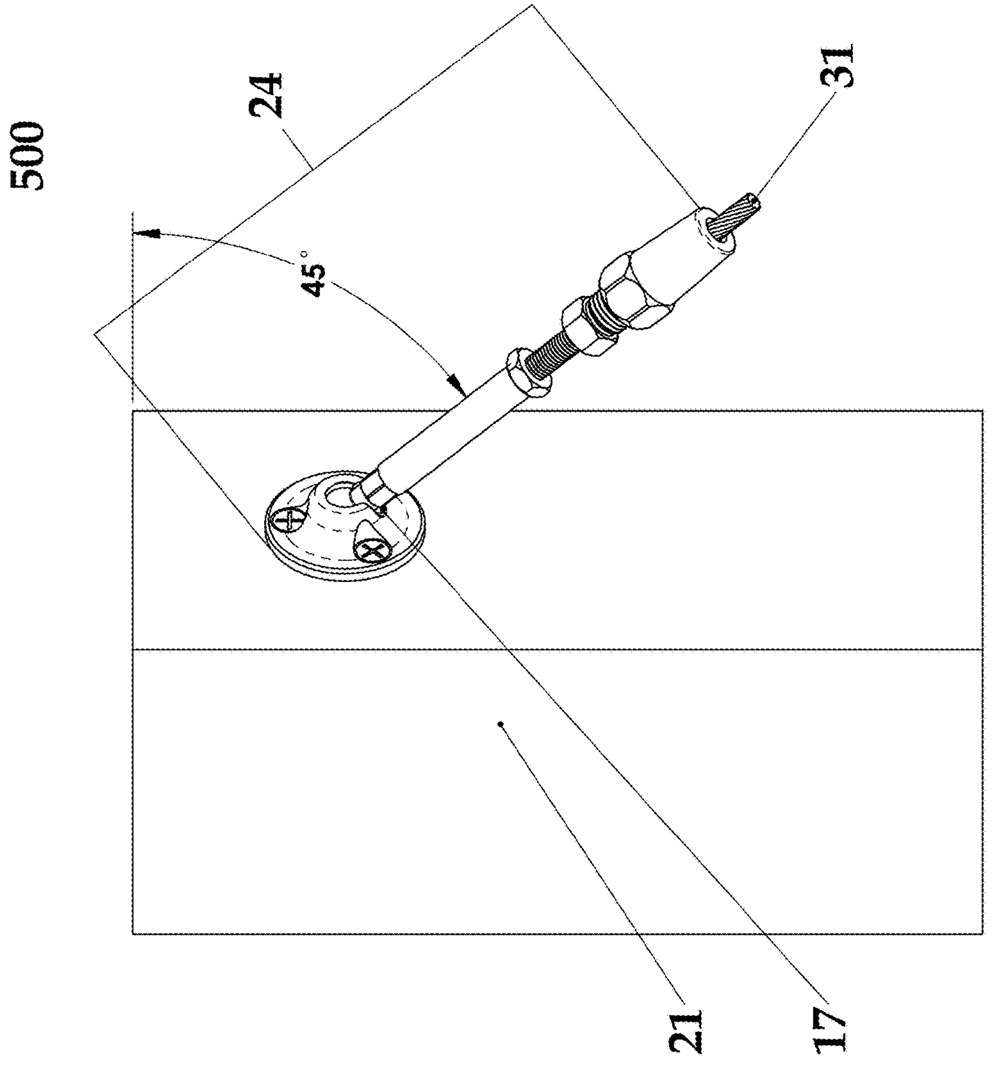
FIG. 5 is a schematic illustrating the angular function of the exemplary attachment assembly and tensioning assembly mounted to a post.

In some embodiments of FIG. 2, mounting plate 15 may be attached to a mounting surface by one or more fasteners, as shown in FIGS. 4 and 5. For example, one or more recessed holes 19 may be placed in a circular pattern sufficient to allow a fastener, such as a wood decking screw 32, to pass through. FIG. 4 includes a schematic 400, illustrating the mounting plate 15 features and mounting to a mounting surface, such as a railing post 21. A center aperture 16 of the mounting plate may allow tubular body 28 to pass through. Internal recess 18, which may be hemispherically contoured, may be adjacent to the center aperture 16, and in some embodiments, may match swivel 22 of the tubular body 28 to allow it to rotate and pivot within mounting plate 15. Groove 17 may be perpendicular to the mounting plate 15, adjacent to the center aperture 16, and pass through the internal recess 18, allowing the tubular body 28 to fit within the groove 17. FIG. 5 includes a schematic 500, illustrating the angular function of the attachment/tensioning assembly 24 of FIGS. 1-3 and 6 when mounted to post 21. As previously introduced, in some embodiments, groove 17 can allow tubular body 28 to point angularly along railing post 21 to direct wire 31 in a preferred direction, for example.

FIG. 3 includes example schematics 300, detailing a series of the attachment and tensioning assemblies of the present disclosure. More specifically, schematics 300 illustrate three example embodiments of possible attachment assemblies, such as system 1, within a tensioning assembly, such as device 24. As previously introduced, collar 2 can include collars 2_1, 2_2, and/or 2_3 of various dimensions. More specifically, collar 2_1 may include an outer diameter 6_1 of a first value, a first hex shoulder 7_1 of a first value, and an overall length 5_1 of a first value, as shown in FIG. 3. FIG. 6 includes an exploded and section schematic 600 of attachment assembly 1 with three potential wire attachment embodiments. As illustrated in schematic 600 of FIG. 6, the attachment and tensioning assemblies of the present disclosure may also include an inside thread 8_1 of a first value, a frustoconical inside shape 4_1 of a first value, and an aperture inside diameter 3_1 of a first value.

Also shown in FIG. 3, an additional attachment assembly 1 may include a second collar 2_1 with an outer diameter 6_2 of a second value, a second hex shoulder 7_2 of a second value, an overall length 5_2 of a second value, an inside thread 8_1 of a first value, a frustoconical inside shape 4_1 of a first value, and aperture inside diameter 3_1 of a first value. Additionally shown in FIG. 3, another attachment assembly 1 may further include a third collar 2_3 with an outer diameter 6_3 of a third value, a third hex shoulder 7_3 of a third value, an overall length 5_3 of a third value, an inside thread 8_1 of a first value, a frustoconical inside shape 4_1 of a first value, aperture inside diameter 3_1 of a first value, and a first gripping wedge 9_1 configured to be fixedly attached to any of the first through third collars 2. In this way, different attachment and tensioning assemblies of the present disclosure may accommodate differing dimensions of wire 31, environments, individual preferences, and/or other considerations. These assemblies 24 can thereby provide further flexibility and customization of dimensions relating to collar 2, even as internal thread 8, frustoconical inside shape 4, aperture inside diameter 3, and/or first gripping wedge 9 may include shared dimensions across multiple embodiments and/or assemblies within a network of assemblies.

As shown in FIG. 6 and throughout the present disclosure, gripping wedge 9 of assemblies 1 and/or 24 may included one or more dimensions within a network of assemblies 1 and/or 24. In some embodiments, first gripping wedge 9_1 may include a first center aperture gripping wedge bore 10_1, with a first inside diameter of a first value, a first outer diameter 12_1 that is smaller than the inside thread 8_1 of the collar 2_1, 2_2, and/or 2_3. Further, gripping wedge 9_1 may include a frustoconical outside shape 11_1 that is about the same as the first through third collars 2_1, 2_2, and/or 2_3 inside frustoconical inside shape 4_1. Thereby, gripping wedge 9_1 may be configured to allow fixed attachment between the first through third collars 2_1, 2_2, and/or 2_3.

In some embodiments of the present disclosure, a second gripping wedge 9_2 may be configured to be fixedly attached to any of the first through third collars 2_1, 2_2, and 2_3, as shown in FIG. 6. This second gripping wedge 9_2 may include a second center aperture gripping wedge bore 10_2, with a second inside diameter of a second value. Gripping wedge 9_2 may include a first outer diameter 12_1 that is smaller than the inside thread 8_1 of a collar 2_1, 2_2, and/or 2_3, with a frustoconical outside shape 11-1 that is about the same as the first through third collars 2_1, 2_2, and/or 2_3 inside frustoconical inside shape 4_1. Thereby, gripping wedge 9_2 may be configured to allow fixed attachment between the first through third collars 2_1, 2_2, and/or 2_3.

In some embodiments, a third gripping wedge 9_3 may be configured to be fixedly attached to any of the first through third collars 2_1, 2_2, and 2_3, as shown in FIG. 6. The third gripping wedge 9_3 may include a third center aperture gripping wedge bore 10_3, with a third inside diameter of a third value. Gripping wedge 9_3 may include a first outer diameter 12_1 that is smaller than the inside thread 8_1 of a collar 2_1, 2_2, and/or 2_3, with a first frustoconical outside shape 11_1 that is about the same as the first through third collar collars 2_1, 2_2, and/or 2_3 inside frustoconical inside shape 4_1. Thereby, gripping wedge 9_3 may be configured to allow fixed attachment between the first through third collars 2_1, 2_2, and/or 2_3.

As shown in FIGS. 3 and 6, wires 31 may include differing dimensions within assemblies 1 and/or 24. In some embodiments, first wire 31_1 may be configured to be fixedly attached to the first gripping wedge 9_1. First wire 31_1 may include a first wire outside diameter of a first value that is about the same as the first center aperture gripping wedge bore 10_1, and thereby be configured to allow a fixed attachment between the first wire 31_1 and the first gripping wedge 9_1. In some embodiments, second wire 31_2 may be configured to be fixedly attached to the second gripping wedge 9_2. Second wire 31_2 may include a second wire outside diameter of a second value that is about the same as the second center aperture gripping wedge bore 10_2, and thereby be configured to allow a fixed attachment between the second wire 31_2 and the second gripping wedge 9_2. In some embodiments, third wire 31_3 may be configured to be fixedly attached to the third gripping wedge 9_3. Third wire 31_3 may include a third wire outside diameter of a third value that is about the same as the second center aperture gripping wedge bore 10_3, and thereby be configured to allow a fixed attachment between the third wire 31_3 and the third gripping wedge 9_3.

The fittings disclosed herein are fabricated from stainless steel. In some implementations, the disclosed mounting plates are either 316 L or 304 L low carbon grade for welding. The backing plate is either 316 or 304 stainless steel. Although the disclosed implementations, are made from stainless steel, it should be understood that various alternative implementations may be made from other metals, such as brass, bronze, aluminum and the like.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A tensioning wire attachment system comprising:

a first collar connectable to a first end of a threaded stud, wherein the threaded stud is connectable at a second end to a mounting plate via a tubular body, the first collar including:

a first hex shoulder of a first hex shoulder value;

a first overall length; and a first aperture comprising:

a first inside diameter;

a first inside thread having a first inside thread value; and a first frustoconical inside shape;

a first gripping wedge having a first outer diameter and a first frustoconical outside shape, the first gripping wedge secured within the first collar via the first inside thread of the first collar, the first gripping wedge having a first bore with a first bore inside diameter, wherein the first gripping wedge secures a first wire within the first bore;

at least one additional collar having a different hex shoulder value and a different overall length as the first collar but having a same inside thread value, frustoconical inside shape, and aperture inside diameter as the first collar, such that the first gripping wedge is fixedly attachable to both of the first collar and the at least one additional collar;

at least one additional gripping wedge having a different bore inside diameter as the first gripping wedge but having a same outer diameter and frustoconical outside shape as the first gripping wedge, such that both of the first gripping wedge and the at least one additional gripping wedge are securable within the first collar to accommodate the first wire and at least one additional wire having a different size as the first wire, respectively; and wherein the first end of the threaded stud is connectable to both of the first collar and the at least one additional collar via a washer disposed about the threaded stud.

2. The tensioner and wire attachment system of claim 1, wherein the at least one additional collar is at least two additional collars.

3. The tensioner and wire attachment system of claim 1, wherein the at least one additional gripping wedge is at least two additional gripping wedges.

4. Wherein the at least one additional wire is at least two additional wires.

5. The tensioner and wire attachment system of claim 1, wherein the threaded stud includes a flat and/or hexed shoulder, an external thread, and a threaded end, wherein the external thread allows attachment to both of the first and at least one additional collar, wherein the threaded end allows attachment to the tubular body and a locking nut.

6. The tensioner and wire attachment system of claim 5, wherein the tubular body includes an internal thread matching the external thread of the threaded stud; a hemispherical end;

and a flat and/or hexed shoulder configured to allow gripping with a wrench.

7. The tensioner and wire attachment system of claim 6, wherein the mounting plate includes:

a center aperture, wherein the center aperture allows the tubular body to pass through;

a recess adjacent to the center aperture, wherein the recess is hemispherical, matches a contour of the tubular body, and is configured for rotational movement of the tubular body; and a groove, wherein the groove is perpendicular to a surface of the mounting plate, wherein the groove allows for the tubular body to pivot within positioning the mounting plate angularly.

8. The tensioner and wire attachment system of claim 7, further comprising one or more additional apertures in a circular arrangement around the center aperture, wherein the one or more additional apertures are configured to allow one or more fasteners to pass through.

9. The tensioner and wire attachment system of claim 8, wherein the one or more fasteners are configured to secure the mounting plate to a mounting surface.

10. The tensioner and wire attachment system of claim 9, including additional collars and/or additional gripping wedges configured to allow one or more wire rope sizes to be attached in the system between one or more of the mounting surfaces.

* * * * *